United States Patent
Frances et al.

(10) Patent No.: US 12,497,509 B2
(45) Date of Patent: Dec. 16, 2025

(54) METHOD FOR MANUFACTURING A SILICONE ELASTOMER ARTICLE USING A 3D PRINTER

(71) Applicants: ELKEM SILICONES France SAS, Lyons (FR); Institut National des Sciences Appliquées LYON, Villeurbanne (FR); Université Claude Bernard Lyon 1, Villeurbanne (FR); Centre national de la recherche scientifique, Paris (FR)

(72) Inventors: Jean Marc Frances, Meyzieu (FR); Arthur Colly, Villeurbanne (FR); Christophe Marquette, Villeurbanne (FR); Edwin-Joffrey Courtial, Villeurbanne (FR)

(73) Assignees: ELKEM SILICONES France SAS, Lyons (FR); Institut National des Sciences Appliquées LYON, Villeurbanne (FR); Université Claude Bernard Lyon 1, Villeurbanne (FR); Centre national de la recherche scientifique, Paris (FR)

( * ) Notice: Subject to any disclaimer, the term of this patent is extended or adjusted under 35 U.S.C. 154(b) by 280 days.

(21) Appl. No.: 18/254,673

(22) PCT Filed: Nov. 29, 2021

(86) PCT No.: PCT/EP2021/083412
§ 371 (c)(1),
(2) Date: May 26, 2023

(87) PCT Pub. No.: WO2022/112571
PCT Pub. Date: Jun. 2, 2022

(65) Prior Publication Data
US 2024/0301203 A1  Sep. 12, 2024

(30) Foreign Application Priority Data

Nov. 30, 2020 (EP) .................................. 20306467

(51) Int. Cl.
B33Y 40/20 (2020.01)
B29C 64/30 (2017.01)
(Continued)

(52) U.S. Cl.
CPC .............. C08L 71/02 (2013.01); B29C 64/30 (2017.08); B33Y 40/20 (2020.01); B33Y 70/00 (2014.12);
(Continued)

(58) Field of Classification Search
None
See application file for complete search history.

(56) References Cited

U.S. PATENT DOCUMENTS

2021/0238418 A1   8/2021  Marquette et al.

FOREIGN PATENT DOCUMENTS

| WO | WO-2019 215190 A1 * | 11/2019 |
| WO | WO-2020/127882 | 6/2020 |
| WO | WO-2020 127882 A1 * | 6/2020 |

OTHER PUBLICATIONS

International Search Report dated Feb. 21, 2022 in International Application No. PCT/EP2021/083412.
(Continued)

*Primary Examiner* — Mohammad M Ameen
(74) *Attorney, Agent, or Firm* — B. Aaron Schulman, Esq.; Stites & Harbison, PLLC

(57) ABSTRACT

The present invention relates to a process for manufacturing a silicone elastomer article comprising the following step: 1) providing a composition C, comprising water, at least one poloxamer and a poly(oxyalkylene glycol), into a container;
(Continued)

2) placing the container comprising the composition C at the required temperature T1 to form a gel; 3) printing a crosslinkable silicone composition X into the gel obtained in 2) with a 3D printer at the required temperature T1; 4) optionally allowing the printed composition X to partially or totally crosslink, optionally by heating, to obtain a silicone elastomer article, in the container; 5) optionally placing the container obtained in step 4) at a temperature T3 lower than the sol-gel transition temperature of composition C; 6) recovering the silicone elastomer article; and 7) optionally washing the obtained silicone elastomer article for example with water at a temperature T3 lower than the sol-gel transition temperature of composition C.

17 Claims, 1 Drawing Sheet

(51) Int. Cl.
*B33Y 70/00* (2020.01)
*C08L 71/02* (2006.01)
*B29K 23/00* (2006.01)
*B29K 83/00* (2006.01)
*B29K 105/00* (2006.01)

(52) U.S. Cl.
CPC ...... *B29K 2023/08* (2013.01); *B29K 2083/00* (2013.01); *B29K 2105/0061* (2013.01); *B29K 2105/0088* (2013.01); *B29K 2105/0094* (2013.01); *B29K 2995/0037* (2013.01); *B29K 2995/0077* (2013.01); *B29K 2995/0088* (2013.01); *C08L 2203/02* (2013.01)

(56) References Cited

OTHER PUBLICATIONS

European Search Report dated May 10, 2021 in European Application No. 20 30 6467.

* cited by examiner

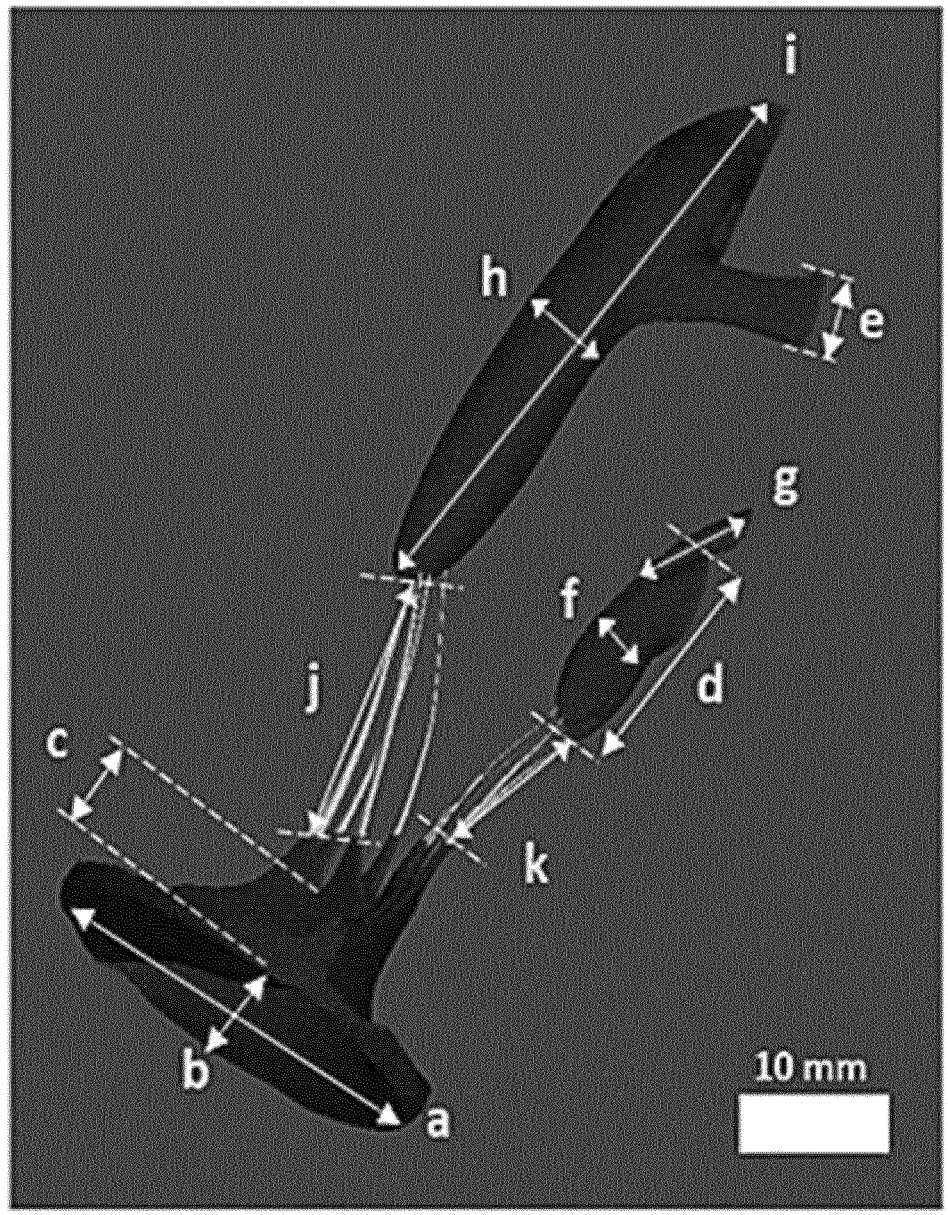

METHOD FOR MANUFACTURING A SILICONE ELASTOMER ARTICLE USING A 3D PRINTER

The present invention relates to a method for manufacturing a silicone elastomer article using a 3D-printer. The present invention also relates to the silicone elastomer article susceptible to be obtained by this method.

In 3D-printing, there is a huge impact of gravity and rheological and mechanical properties of the composition used for printing, notably for the manufacturing of complex article. Especially, low viscosity silicone compositions (<100000 mPa·s) can't be printed in classic atmosphere with "earth" gravity for simple or complex objects. Indeed, the rheological and mechanical properties of these silicones don't allow users to hold object during printing. Moreover, the atmospheric pressure and the surface tension make it difficult to give filament extrusion. For silicone formulations with medium or high viscosity (>100000 mPa·s), the printability depends on rheological and mechanical properties. However, it is not possible to print articles with a complex shape (i.e. article having overhang>40°, bridge or height>2 mm).

Freeform Reversible Embedding of Suspended Hydrogel (FRESH) is an additive manufacturing technique enabling the 3D printing of soft materials with low or no yield stress. The printed material is embedded during the process until its solidification. From the literature, FRESH abilities shall be self-healing, reusability, suspending, thermal stability and high precision printing.

US20180057682 discloses the use of an organic microgel obtained by blending a diblock copolymer polystyrene-block ethylene/propylene (SEP) and a triblock copolymer polystyrene-block ethylene/butylene-block-polystyrene (SEBS) in mineral oil, as support material for 3D printing. The rheological properties of this organic microgel can be tuned, leveraging the jamming transition to facilitate its use in 3D printing of silicone structures. It is necessary to remove the cured part from the organic microgel support material by serially washing it with solvents (methanol) and surfactant solutions. The support material does not seem to be reusable.

It is also disclosed by Hinton et al. (Science Advances, 2015, Vol. 1, no. 8) a method to print silicone 3D objects by using three different gels: Carbopol 940, ETD 2020, and Ultrez 30 (Lubrizol), which are cross-linked acid acrylic polymers. Carbopol 940 gives best surface aspect. However, the Carbopol 940 is requiring an accurate pH and salt control which can be a limit to print different type of silicones. Contrary to the title of publication, the gel seems not be used anymore because Carbopol 940 is diluted with PBS (PolyButadiene/Styrene) solution to remove the printed silicone object after 15 minutes.

It is also known from WO2019215190 the use of a gel of poloxamer as a constrained environment that enables to print low viscous crosslinking composition to obtain silicone elastomer articles. This gel can enable to print some objects. However, depending on the complexity of the objects and the path of the printing nozzle, it seemed that the static yield stresses of the suspended hydrogels were sometimes too high (200 Pa and 500 Pa for 23 wt % and 27 wt % formulation, respectively), causing the bending of the printing nozzle and affecting the printing accuracy.

There is thus a need to provide a gel composition that can be used as a constrained environment for FRESH 3D printing and that has improved self-healing properties especially for printing complex objects.

There is a need to provide a method for manufacturing silicone elastomer article using a 3D-printer and which can be handling with a great variety of silicone elastomer.

A first object of the present invention is thus to provide a gel composition that can be used as a constrained environment for FRESH 3D printing and that has improved self-healing properties.

Another object is also a method for manufacturing silicone elastomer articles using a 3D-printer and which can be used with a great variety of silicone compositions.

Another object of the present invention is to provide such a method which enables to manufacture complex shape articles, i.e. article having overhang>40°, bridge or height>2 mm.

All these objectives are fulfilled by the present invention which relates to a process for manufacturing a silicone elastomer article comprising the following steps:

1) providing a composition C, comprising water, at least one poloxamer and a poly(oxyalkylene glycol) (also called polyalkylene oxide), into a container;
2) placing the container comprising the composition C at the required temperature T1 to form a gel;
3) printing a crosslinkable silicone composition X into the gel obtained in 2) with a 3D printer at the required temperature T1;
4) optionally allowing the printed composition X to partially or totally crosslink, optionally by heating, to obtain a silicone elastomer article, in the container;
5) optionally placing the container obtained in step 4) at a temperature T3 lower than the sol-gel transition temperature of composition C;
6) recovering the silicone elastomer article; and
7) optionally washing the obtained silicone elastomer article, for example with water at a temperature T3 lower than the sol-gel transition temperature of composition C.

The poloxamer must be non-compatible with the silicone elastomer, i.e. there is no interpenetration between the poloxamer and the silicone elastomer. This advantageously enables to obtain a good surface roughness of the silicone article manufactured, i.e. a roughness less than 100 nm.

Moreover, the poloxamer shall be removed without polluting the silicone surface of the article.

According to the present invention, a poloxamer is a copolymer composed of poly(propylene oxide) (PO) and poly(ethylene oxide) (EO) block also named poly(propylene oxide) poly(ethylene oxide) block copolymer. Preferably, a poloxamer according to the invention is a triblock copolymer composed of a central PO block and two terminal EO block also named poly(ethylene oxide) poly(propylene oxide) poly(ethylene oxide) block copolymer, i.e the poloxamer according to the invention is preferably of the type EO-PO-EO triblock copolymer.

An important characteristic of poloxamer is that they form gel with water in a sol-gel transition temperature process. At sol-gel transition temperature the rheological properties of a composition changes from a liquid-like state to a solid-like state. Aqueous solutions of poloxamers are liquid at low temperature and form a gel at higher temperature in a thermoreversible process. The transitions that occur in these systems depend on the poloxamer and its concentration. In the present invention, temperature T1 corresponds to the temperature at which the composition C forms a gel and temperature T3 is the temperature below which the gel formed with the composition C at step 2 liquefies.

Preferably, in the present invention, the poloxamer composition C is solid at ambient temperature, i.e at a temperature between 20 and 30° C. and liquid at lower temperature, i.e. at temperature below 15° C. Preferably, in the present invention, the poloxamer is composed of poly(propylene oxide) (PO) and poly(ethylene oxide) (EO) block. Preferably, the poloxamer of the invention is a triblock copolymer composed of a central PO block and two terminal EO blocks, and comprise from 25 to 90% by weight of EO units based on the total weight of the poloxamer, preferably from 30 to 80% by weight of EO units based on the total weight of the poloxamer, preferably from 50 to 75%, by weight of EO units based on the total weight of the poloxamer.

More preferably, the poloxamer according to the invention is a triblock copolymer composed of a central PO block and two terminal EO blocks for which the two EO blocks comprise each between 20 and 300 repeat units, preferably between 50 and 150 repeat units and the PO block comprises between 10 and 100 repeat units, preferably between 30 and 70 repeat units.

Advantageously, the poloxamer of the invention is a triblock copolymer composed of a central PO block and two terminal EO blocks with 70%+/−2% by weight of EO units. In a preferred embodiment, the poloxamer according to the invention is a triblock copolymer composed of a central PO block and two terminal EO blocks where the two EO blocks comprise each 100+/−10 repeat units and the PO block comprise 55+/−10 repeat units. Such poloxamer is for example sold under the name Pluronic F127® by BASF.

Moreover, poloxamer and especially Pluronic F127® are biocompatible and thus can be used to prepare article for biological or medical uses.

The poly(oxyalkylene glycol) (PAG) of the invention is preferably a poly(oxyalkylene glycol) having a molecular mass by weight (Mw) comprised between 100 and 6000 g/mol, preferably between 200 and 2000 g/mol.

Without to be bound by any theory, the poly(oxyalkylene glycol) is preferably chosen depending on the external block of the poloxamer. Preferably, the poly(oxyalkylene glycol) should have the same nature than the external block of the poloxamer, by nature it is to be understood that the alkylene of the poly(oxyalkylene glycol) is the same that the one of the external bloc of the poloxamer.

The poly(oxyalkylene glycol) (which is either in liquid form or in a powder form depending on the molecular mass) is dispersed in water before addition of the poloxamer.

Preferably, the poly(oxyalkylene glycol) of the invention is a poly(oxyethylene glycol) (or polyethylene oxide, PEG), preferably a PEG having a molecular mass by weight (Mw) comprised between 100 and 6000 g/mol, preferably between 200 and 2000 g/mol.

In the composition (C) of the present invention, the poloxamer is preferably a triblock copolymer composed of a central PO block and two terminal EO block and the poly(oxyalkylene glycol) is preferably a PEG preferably having a molecular mass by weight (Mw) comprised between 100 and 6000 g/mol, preferably between 200 and 2000 g/mol.

Without to be bound by any theory, the gel formed from composition C acts as a constrained environment which enables to print low viscous crosslinking compositions X to further obtain silicone elastomer articles. Indeed, the gel formed from composition C applies a constant pressure to the crosslinking composition X during printing which enables to avoid any drop of the material. The pressure applied may be measured with a rheological characterization (shear stress in function of shear rate) using yield stress parameters Bingham fluid, the range of yield stress is preferably between 1 and 10 Pa.

Advantageously, the gel formed from composition C is self-healing. This advantageously allows a printing nozzle to repeatedly pass through the gel in the same area while the gel is simultaneously supporting the printed structure.

Advantageously, the poly(oxyalkylene glycol) added to the poloxamer aqueous composition acts as a softening agent of the gel formed, enabling a better self-healing while keeping and improving the properties of the gel for FRESH 3D printing. Indeed the addition of PAG enables to adapt the rheological properties (the PAG is a yield stress regulator) and enables a reduction of the gelation temperature, a reduction of the yield stress and a reduction of viscosity. Decreasing and controlling the static yield stress enables a better self-healing of the hydrogel during the process while maintaining the printed object suspended.

Preferably, the static yield stress of gel C, at a temperature comprised between 20° C. and 50° C., preferably between 20 and 40° C., is comprised between 1 and 100 Pa, preferably between 1 to 50 Pa. The static yield stress can be measured according to any method known by the skilled person, especially Rheology measurements were conducted using a controlled-stress rheometer (DHR-2 rheometer, TA Instruments, USA) with concentric cylinders geometry of 14 mm radius and 42 mm height. 15 mL of composition C were introduced with a gap fixed at 3580 μm. First, gelation temperatures ($T_{gel}$) were obtained from a frequency sweep procedure (from 0.1 to 100 rad/s) after linear field checking. The gelation temperature was defined when tan δG"/G'=1. Then, the static yield stress values were measured by applying a shear rate sweep from 10 to $10^{-5}$ $s^{-1}$ and measuring the stress at various temperatures: 10 to 40° C. with a step of 5° C. The viscosity of the silicone material was measured with a cone plate geometry of 40 mm radius and angle of 2° with a 50-μm gap.

Preferably, the ratio by weight PAG/poloxamer is such that the static yield stress of gel C, at a temperature comprised between 20° C. and 50° C., preferably between 20 and 40° C., is comprised between 0.5 and 200 Pa, preferably between 1 and 100, more preferably between 1 to 50 Pa.

Preferably, the ratio by weight PAG/poloxamer is greater than 0.5, preferably greater than 1. It is preferably comprised between 0.5 and 2, preferably between 0.5 and 1.5, preferably between 1 and 2, preferably between 1.1 and 1.5.

Preferably, composition C comprises from 10 to 40%, more preferably from 15 to 30% and even more preferably from 17 to 25%, by weight of at least one poloxamer and preferably at least one poloxamer such as described above.

In the composition (C) of the present invention, the poloxamer is preferably a triblock copolymer composed of a central PO block and two terminal EO block and the poly(oxyalkylene glycol) is preferably a PEG preferably having a molecular mass by weight (Mw) comprised between 100 and 6000 g/mol, preferably between 200 and 2000 g/mol, preferably 400 g/mol and the ratio by weight PEG/poloxamer is greater than 1 preferably between 1 and 2, preferably between 1.1 and 1.5.

Advantageously, in order to provide a functionalization of the surface of the silicone elastomer article obtained by the method of the invention, the composition C can further comprise one or more compounds chosen among:
  a base, for example NaOH;
  an acid, for example acetic acid;
  a functionalized silane, for example with amino, epoxy, hydroxy, polyether (especially stable at pH comprised between 4 and 5) groups.

In step 1, composition C has to be placed at a temperature T1 enabling to form a gel. The skilled person can determine the temperature range based on its general knowledge and based on the poloxamer used. Preferably, T1 is comprised between 20 and 50° C., preferably between 25 and 50° C., more preferably between 25 and 40° C., for example between 25 and 35° C. and even more preferably between 28 and 32° C.

Composition C can be obtained by dispersing the poly (oxyalkylene) glycol into water and then addition of the poloxamer.

In the process according to the invention, composition X is a crosslinkable silicone composition having preferably a viscosity comprised between 1000 mPa·s and 1000000 mPa·s. The process according to the invention is especially adapted to print a crosslinkable silicone composition X having a viscosity lower than 50000 mPa·s, preferably lower than 10000 mPa·s, for example comprised between 1000 to 5000 mPa·s.

All the viscosities under consideration in the present description correspond to a "Newtonian" dynamic viscosity magnitude at 25° C., i.e. the dynamic viscosity that is measured, in a manner that is known per se, with a Brookfield viscometer at a shear rate gradient that is low enough for the measured viscosity to be independent of the rate gradient.

The crosslinkable silicone composition X can be a silicone composition crosslinkable through addition reaction or through polycondensation reaction.

In one embodiment, the crosslinkable silicone composition X is a silicone composition crosslinkable through addition reaction. In this embodiment, the composition X comprises:

(A) at least one organopolysiloxane compound A comprising, per molecule at least two $C_2$-$C_6$ alkenyl radicals bonded to silicon atoms,
(B) at least one organohydrogenopolysiloxane compound B comprising, per molecule, at least two hydrogen atoms bonded to an identical or different silicon atom,
(C) at least one catalyst Cat consisting of at least one metal or compound, from the platinum group,
(D) optionally a filler D and
(F) optionally a crosslinking inhibitor F.

Organopolysiloxane A

According to a particularly advantageous mode, the organopolysiloxane A comprising, per molecule, at least two $C_2$-$C_6$ alkenyl radicals bonded to silicon atoms, comprises:
(i) at least two siloxyl units (A.1), which may be identical or different, having the following formula:

(A.1)

in which:
a=1 or 2, b=0, 1 or 2 and a+b=1, 2 or 3;
the symbols W, which may be identical or different, represent a linear or branched $C_2$-$C_6$ alkenyl group,
and the symbols Z, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals, (ii) and optionally at least one siloxyl unit having the following formula:

(A.2)

in which:
a=0, 1, 2 or 3,
the symbols $Z^1$, which may be identical or different, represent a monovalent hydrocarbon-based group containing from 1 to 30 carbon atoms, preferably chosen from the group formed by alkyl groups containing from 1 to 8 carbon atoms inclusive and aryl groups containing between 6 and 12 carbon atoms, and even more preferentially chosen from the group formed by methyl, ethyl, propyl, 3,3,3-trifluoropropyl, xylyl, tolyl and phenyl radicals.

Advantageously, Z and $Z^1$ are chosen from the group formed by methyl and phenyl radicals, and W is chosen from the following list: vinyl, propenyl, 3-butenyl, 5-hexenyl, 9-decenyl, 10-undecenyl, 5,9-decadienyl and 6-11-dodecadienyl, and preferably, W is a vinyl.

In a preferably embodiment, in formula (A.1) a=1 and a+b=2 or 3 and in formula (A.2) c=2 or 3.

These organopolysiloxanes A may have a linear, branched or cyclic structure. Their degree of polymerization is preferably between 2 and 5000.

When they are linear polymers, they are essentially formed from siloxyl units D chosen from the group formed by the siloxyl units $W_2SiO_{2/2}$, $WZSiO_{2/2}$ and $Z^1{}_2SiO_{2/2}$, and from siloxyl units M chosen from the group formed by the siloxyl units $W_3SiO_{1/2}$, $WZ_2SiO_{1/2}$, $W_2ZSiO_{1/2}$ and $Z^1{}_3SiO_{1/2}$. The symbols W, Z and $Z^1$ are as described above.

As examples of end units M mention may be made of trimethylsiloxy, dimethylphenylsiloxy, dimethylvinylsiloxy or dimethylhexenylsiloxy groups.

As examples of units D, mention may be made of dimethylsiloxy, methylphenylsiloxy, methylvinylsiloxy, methylbutenylsiloxy, methylhexenylsiloxy, methyldecenylsiloxy or methyldecadienylsiloxy groups.

Said organopolysiloxanes A may be oils with a dynamic viscosity from about 10 to 1000000 mPa·s at 25° C., generally from about 1000 to 120000 mPa·s at 25° C.

When they are cyclic organopolysiloxanes, they are formed from siloxyl units D having the following formulae: $W_2SiO_{2/2}$, $Z_2SiO_{2/2}$ or $WZSiO_{2/2}$, which may be of the dialkylsiloxy, alkylarylsiloxy, alkylvinylsiloxy or alkylsiloxy type. Examples of such siloxyl units have already been mentioned above. Said cyclic organopolysiloxanes A have a viscosity from about 1 to 5000 mPa·s at 25° C.

Preferably, the organopolysiloxane compound A has a weight content of Si-vinyl units of between 0.001 and 30%, preferably between 0.01 and 10%.

Organohydrogenpolysiloxane B

According to a preferred embodiment, the organohydrogenopolysiloxane compound B is an organopolysiloxane containing at least two hydrogen atoms per molecule, bonded to an identical or different silicon atom, and preferably containing at least three hydrogen atoms per molecule directly bonded to an identical or different silicon atom.

Advantageously, the organohydrogenopolysiloxane compound B is an organopolysiloxane comprising:
(i) at least two siloxyl units and preferably at least three siloxyl units having the following formula:

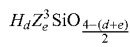 (B.1)

in which:
d=1 or 2, e=0, 1 or 2 and d+e=1, 2 or 3,
the symbols $Z^3$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals, and (ii) optionally at least one siloxyl unit having the following formula:

 (B.2)

in which:
c=0, 1, 2 or 3,
the symbols $Z^2$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals.

The organohydrogenopolysiloxane compound B may be formed solely from siloxyl units of formula (B.1) or may also comprise units of formula (B.2). It may have a linear, branched or cyclic structure. The degree of polymerization is preferably greater than or equal to 2. More generally, it is less than 5000.

Examples of siloxyl units of formula (B.1) are especially the following units: $H(CH_3)_2SiO_{1/2}$, $HCH_3SiO_{2/2}$ and $H(C_6H_5)SiO_{2/2}$.

When they are linear polymers, they are essentially formed from:
siloxyl units D chosen from the units having the following formulae $Z^2{}_2SiO_{2/2}$ or $Z^3HSiO_{2/2}$, and
siloxyl units M chosen from the units having the following formulae $Z^2{}_3SiO_{1/2}$ or $Z^3{}_2HSiO_{1/2}$,
the symbols $Z^2$ and $Z^3$ are as described above.

These linear organopolysiloxanes may be oils with a dynamic viscosity from about 1 to 100000 mPa·s at 25° C., generally from about 10 to 5000 mPa·s at 25° C., or high viscous oils with a viscosity of about 1000000 mPa·s or more at 25° C.

When they are cyclic organopolysiloxanes, they are formed from siloxyl units D having the following formulae $Z^2{}_2SiO_{2/2}$ and $Z^3HSiO_{2/2}$, which may be of the dialkylsiloxy or alkylarylsiloxy type or units $Z^3HSiO_{2/2}$ solely. They then have a viscosity from about 1 to 5000 mPa·s.

Examples of linear organohydrogenopolysiloxane compounds B are: dimethylpolysiloxanes bearing hydrogenodimethylsilyl end groups, dimethylhydrogenomethylpolysiloxanes bearing trimethylsilyl end groups, dimethylhydrogenomethylpolysiloxanes bearing hydrogenodimethylsilyl end groups, hydrogenomethylpolysiloxanes bearing trimethylsilyl end groups, and cyclic hydrogenomethylpolysiloxanes.

The oligomers and polymers corresponding to the general formula (B.3) are especially preferred as organohydrogenopolysiloxane compound B:

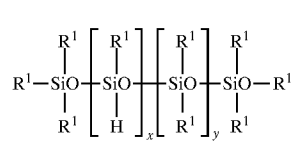 (B.3)

in which:
x and y are an integer ranging between 0 and 200,
the symbols $R^1$, which may be identical or different, represent, independently of each other:
a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl,
a cycloalkyl radical containing between 5 and 8 cyclic carbon atoms,
an aryl radical containing between 6 and 12 carbon atoms, or
an aralkyl radical bearing an alkyl part containing between 5 and 14 carbon atoms and an aryl part containing between 6 and 12 carbon atoms.

The following compounds are particularly suitable for the invention as organohydrogenopolysiloxane compound B:

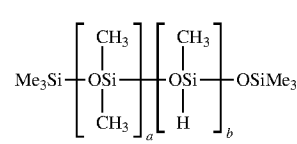

S1

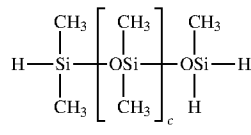

S2

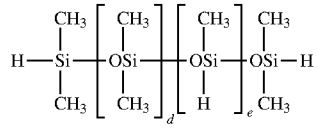

S3 with a, b, c, d and e defined below:
in the polymer of formula S1:
$0 \leq a \leq 150$, preferably $0 \leq a \leq 100$, and more particularly $0 \leq a \leq 20$, and
$1 \leq b \leq 90$, preferably $10 \leq b \leq 80$ and more particularly $30 \leq b \leq 70$,
in the polymer of formula S2: $0 \leq c \leq 15$
in the polymer of formula S3: $5 \leq d \leq 200$, preferably $20 \leq d \leq 100$, and $2 \leq e \leq 90$, preferably $10 \leq e \leq 70$.

In particular, an organohydrogenopolysiloxane compound B that is suitable for use in the invention is the compound of formula S1, in which a=0.

Preferably, the organohydrogenopolysiloxane compound B has a weight content of SiH units of between 0.2 and 91%, preferably between 0.2 and 50%.

In an embodiment, the organohydrogenopolysiloxane compound B is a branched polymer.

Said branched organohydrogenopolysiloxane compound B comprises:
- a) at least two different siloxyl units selected from siloxyl unit M of formula $R_3SiO_{1/2}$, siloxyl unit D of formula $R_2SiO_{2/2}$, siloxyl unit T of formula $RSiO_{3/2}$ and siloxyl unit Q of formula $SiO_{4/2}$, in which R denotes monovalent hydrocarbon group with 1 to 20 carbon atoms or an hydrogen atom, and
- b) provided that at least one of these siloxyl units is siloxyl unit T or Q and at least one of siloxyl units M, D or T contains a Si—H group.

Thus, according to one preferable embodiment, the branched organohydrogenopolysiloxane compound B can be selected from the following groups:

organopolysiloxane resin of formula M'Q, which is essentially formed from:
- (a) monovalent siloxyl unit M' of formula $R_2HSiO_{1/2}$; and
- (b) tetravalent siloxyl unit Q of formula $SiO_{4/2}$; and organopolysiloxane resin of formula MD'Q, which is basically constituted of the following units:
- (a) divalent siloxyl unit D' of formula $RHSiO_{2/2}$;
- (b) monovalent siloxyl unit M of formula $R_3SiO_{1/2}$; and
- (c) tetravalent siloxyl unit Q of formula $SiO_{4/2}$;

wherein R represents monovalent hydrocarbyl having 1 to 20 carbon atoms, preferably represents monovalent aliphatic or aromatic hydrocarbyl having 1 to 12, more preferably 1 to 8 carbon atoms.

As a further embodiment, a mixture of at least a linear organohydrogenopolysiloxane compound B and at least a branched organohydrogenopolysiloxane compound B can be used. In this case, the linear and branched organohydrogenopolysiloxane compound B can be mixed in any proportion in a wide range, and the mixing proportion may be adjusted depending on the desired product properties such as hardness and the ratio of Si—H to alkenyl group.

In the context of the invention, the proportions of the organopolysiloxane A and of the organohydrogenopolysiloxane B are such that the mole ratio of the hydrogen atoms bonded to silicon (Si—H) in the organohydrogenopolysiloxane B to the alkenyl radicals bonded to silicon (Si—CH=CH$_2$) in the organopolysiloxane A is between 0.2 and 20, preferably between 0.5 and 15, more preferentially between 0.5 and 10 and even more preferentially between 0.5 and 5.

Catalyst Cat

Catalyst Cat consisting of at least one metal, or compound, from the platinum group are well known. The metals of the platinum group are those known under the name platinoids, this term combining, besides platinum, ruthenium, rhodium, palladium, osmium and iridium. Platinum and rhodium compounds are preferably used. Complexes of platinum and of an organic product described in patents U.S. Pat. Nos. 3,159,601, 3,159,602, 3,220,972 and European patents EP A 0 057 459, EP A 0 188 978 and EP A 0 190 530, and complexes of platinum and of vinylorganosiloxanes described in patents U.S. Pat. Nos. 3,419,593, 3,715,334, 3,377,432 and 3,814,730 may be used in particular. Specific examples are: platinum metal powder, chloroplatinic acid, a complex of chloroplatinic acid with β-diketone, a complex a chloroplatinic acid with olefin, a complex of a chloroplatinic acid with 1,3-divinyltetramethyldisiloxane, a complex of silicone resin powder that contains aforementioned catalysts, a rhodium compound, such as those expressed by formulae: $RhCl(Ph_3P)_3$, $RhCl_3[S(C_4H_9)_2]_3$, etc.; tetrakis(triphenyl)palladium, a mixture of palladium black and triphenylphosphine, etc.

The platinum catalyst ought preferably to be used in a catalytically sufficient amount, to allow sufficiently rapid crosslinking at room temperature. Typically, 1 to 200 ppm by weight of the catalyst are used, based in the amount of Pt metal, relative to the total silicone composition preferably 1 to 100 ppm by weight, more preferably 1 to 50 ppm by weight.

Filler D

To allow a sufficiently high mechanical strength the addition-crosslinking silicone compositions can comprise filler, such as for example silica fine particles, as reinforcing fillers D. Precipitated and fumed silicas and mixtures thereof can be used. The specific surface area of these actively reinforcing fillers ought to be at least 50 m$^2$/g and preferably in the range from 100 to 400 m$^2$/g as determined by the BET method. Actively reinforcing fillers of this kind are very well-known materials within the field of the silicone rubbers. The stated silica fillers may have hydrophilic character or may have been hydrophobized by known processes.

In a preferred embodiment, the silica reinforcing filler is fumed silica with a specific surface area of at least 50 m$^2$/g and preferably in the range from 100 to 400 m$^2$/g as determined by the BET method. Fumed silica may be used as is, in an untreated form, but is preferably subjected to hydrophobic surface treatment. In those cases, where a fumed silica that has undergone hydrophobic surface treatment is used, either a fumed silica that has been subjected to preliminary hydrophobic surface treatment may be used, or a surface treatment agent may be added during mixing of the fumed silica with the organopolysiloxane A, so that the fumed silica is treated in-situ.

The surface treatment agent may be selected from any of the conventionally used agents, such as alkylalkoxysilanes, alkylchlorosilanes, alkylsilazanes, silane coupling agents, titanate-based treatment agents, and fatty acid esters, and may use either a single treatment agent, or a combination of two or more treatment agents, which may be used either simultaneously or at different timings.

The amount of the silica reinforcing filler D in the addition-crosslinking silicone compositions is in the range from 5% to 40% by weight, preferably 10% to 35% by weight of the total composition. If this blend quantity is less than 5% by weight, then adequate elastomer strength may not be obtainable, whereas if the blend quantity exceeds 40% by weight, the actual blending process may become difficult.

The silicone compositions according to the invention may also comprise other fillers like a standard semi-reinforcing or packing filler, hydroxyl functional silicone resins, pigments, or adhesion promoters.

Non siliceous minerals that may be included as semi-reinforcing or packing mineral fillers can be chosen from the group constituted of: carbon black, titanium dioxide, aluminium oxide, hydrated alumina, calcium carbonate, ground quartz, diatomaceous earth, zinc oxide, mica, talc, iron oxide, barium sulfate and slaked lime.

Silicone resin denotes an organopolysiloxane comprising at least one T and/or one Q siloxy unit with Q: $SiO_{2/2}$ and T: $R1SiO_{3/2}$. The hydroxyl functional silicone resin are well known and can be chosen from MQ(OH), MDT(OH), or DT(OH) resins with M: R1 R2R3SiO$_{1/2}$, D:R1R2SiO2/2, Q(OH): $(OH)SiO_{3/2}$, and T(OH): $(OH)R1SiO_{2/2}$, the R1, R2 and R3 groups being chosen independently of one another from:

linear or branched alkyl groups having from 1 to 8 carbon atoms inclusive, optionally substituted by one or more halogen atoms; and aryl or alkylaryl groups containing from 6 to 14 carbon atoms inclusive.

Preferably, the hydroxyl functional silicone resin is a MQ(OH) resin.

Crosslinking Inhibitor F

Crosslinking inhibitors are commonly used in addition crosslinking silicone compositions to slow the curing of the composition at ambient temperature. The crosslinking inhibitor F may be chosen from the following compounds:

acetylenic alcohols.

organopolysiloxanes substituted with at least one alkenyl that may optionally be in cyclic form, tetramethylvinylcyclotetrasiloxane being particularly preferred, pyridine, organic phosphines and phosphites, unsaturated amides, and alkyl or alkenyl maleates.

These acetylenic alcohols (see FR-B-1 528 464 and FR-A-2 372 874), which are among the preferred hydrosilylation-reaction thermal blockers, have the formula:

(R')(R")(OH)C—C≡CH in which: R' is a linear or branched alkyl radical, or a phenyl radical; and —R" is H or a linear or branched alkyl radical, or a phenyl radical; the radicals R' and R" and the carbon atom a to the triple bond possibly forming a ring.

The total number of carbon atoms contained in R' and R" being at least 5 and preferably from 9 to 20. For the said acetylenic alcohols, examples that may be mentioned include:

1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
2-methyl-3-butyn-2-ol;
3-methyl-1-pentadecyn-3-ol; and
diallyl maleate or diallyl maleate derivatives.

In a preferred embodiment, the crosslinking inhibitor is 1-ethynyl-1-cyclohexanol To obtain a longer working time or "pot life", the quantity of the inhibitor is adjusted to reach the desired "pot life". The concentration of the catalyst inhibitor in the present silicone composition is sufficient to slow curing of the composition at ambient temperature. This concentration will vary widely depending on the particular inhibitor used, the nature and concentration of the hydrosilylation catalyst, and the nature of the organohydrogenopolysiloxane. Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for an inhibitor in a given silicone composition can be readily determined by routine experimentation.

Advantageously, the amount of the crosslinking inhibitor F in the addition-crosslinking silicone compositions is in the range from 0.01% to 0.2% weight, preferably from 0.03% to 0.15% weight with respect to the total weight of the silicone composition.

The use of the inhibitor is effective to avoid the premature curing of the silicone composition on the tip of the nozzle and subsequent disfiguration of the printed layer.

Optionally, the silicone composition X can further comprise a thixotropic agent. The thixoropic agent can be an organopolysiloxane-polyoxyalkylene copolymer F.

Organopolysiloxane-polyoxyalkylene copolymer F, also known as polydiorganosiloxane-polyether copolymers or polyalkylene oxide modified polymethylsiloxane, are organopolysiloxanes containing siloxyl units which carry alkylene oxide chain sequences. Preferably, organopolysiloxane-polyoxyalkylene copolymer F are organopolysiloxanes containing siloxyl units which carry ethylene oxide chain sequences and/or propylene oxide chain sequences.

In a preferred embodiment the organopolysiloxane-polyoxyalkylene copolymer F is an organopolysiloxane containing siloxyl comprising units of the formula (F-1):

$$[R^1_a Z_b SiO_{(4-a-b)/2}]_n \quad (F-1)$$

in which each $R^1$ is independently selected from hydrocarbon-based group containing from 1 to 30 carbon atoms, preferably chosen from the group formed by alkyl groups containing from 1 to 8 carbon atoms and aryl groups containing between 6 and 12 carbon atoms;

each Z is a group $-R^2-(OC_pH_{2p})_q(OC_rH_{2r})_s-OR^3$, where n is an integer greater than 2;

a and b are independently 0, 1, 2 or 3; and a+b=0, 1, 2 or 3, $R^2$ is a divalent hydrocarbon group having from 2 to 20 carbon atoms or a direct bond;

$R^3$ is an hydrogen atom or a group as defined for $R^1$;

p and r are independently an integer from 1 to 6;

q and s are independently 0 or an integer such that 1<q+s<400;

and wherein each molecule of the organopolysiloxane-polyoxyalkylene copolymer E contains at least one group Z.

In a preferred embodiment, in the formula (F-1) above:

n is an integer greater than 2; and a+b=0, 1, 2 or 3, a and b are independently 0, 1, 2 or 3;

$R^1$ is an alkyl group containing from 1 to 8 carbon atoms inclusive, and most preferably $R^1$ is a methyl group, $R^2$ is a divalent hydrocarbon group having from 2 to 6 carbon atoms or a direct bond;

p=2 and r=3, q is comprised between 1 and 40, most preferably between 5 and 30, s is comprised between 1 and 40, most preferably between 5 and 30, and $R^3$ is an hydrogen atom or an alkyl group containing from 1 to 8 carbon atoms inclusive, and most preferably $R^3$ is an hydrogen atom.

In a most preferred embodiment, the organopolysiloxane-polyoxyalkylene copolymer F is an organopolysiloxane containing a total number of siloxyl units (F-1) comprised 1 and 200, preferably between 50 and 150 and a total number of Z groups comprised between 2 and 25, preferably between 3 and 15.

An example of organopolysiloxane-polyoxyalkylene copolymer F that can be used in the method of the invention corresponds to the formula (F-2)

$$R^a_3SiO[R^a_2SiO]_t[R^aSi(R^b-(OCH_2CH_2)_x(OC_3H_6)_y-OR^c)O]_zSiR^a_3 \quad (F-2)$$

where
- each $R^a$ is independently selected from alkyl groups containing from 1 to 8 carbon atoms and preferably $R^a$ is a methyl group,
- each $R^b$ is a divalent hydrocarbon group having from 2 to 6 carbon atoms or a direct bond, and preferably $R^b$ is a propyl group,
- x and y are independently integers comprised from 1 to 40, preferably from 5 and 30, and most preferably from 10 to 30,
- t is comprised from 1 to 200, preferably from 25 to 150,
- r is comprised from 2 to 25, preferably from 3 to 15, and
- $R^c$ is H or alkyl group preferentially H or $CH_3$ group.

Advantageously, in an embodiment the organopolysiloxane-polyoxyalkylene copolymer F is:

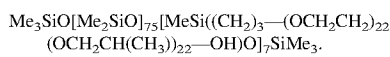
$Me_3SiO[Me_2SiO]_{75}[MeSi((CH_2)_3—(OCH_2CH_2)_{22}$
$(OCH_2CH(CH_3))_{22}—OH)O]_7SiMe_3$.

Methods of preparing polydiorganosiloxane-polyoxyalkylene copolymers are well known in the art. For example, a polydiorganosiloxane-polyoxyalkylene copolymer can be prepared using a hydrosilylation reaction by reacting, for example, a polydiorganosiloxane containing silicon-bonded hydrogen atoms with a polyoxyalkylene containing groups having aliphatic unsaturation in the presence of a platinum group catalyst.

The amount of organopolysiloxane-polyoxyalkylene copolymer F in the addition-crosslinking silicone compositions is at least 0.3% weight, preferably at least 0.4% weight, most preferably in the range from 0.6% to 4% weight, and even most preferably from 0.6% to 3% weight with respect to the total weight of the silicone composition.

In a preferably embodiment, the crosslinkable silicone composition X of the invention comprises, per 100% weight of the silicone composition:
- from 55 to 80% weight of at least one organopolysiloxane compound A;
- from 0.1 to 5% weight of at least one organohydrogenopolysiloxane compound B;
- from 0 to 20% weight of at least one filler, preferably reinforcing silica filler D;
- from 0.002 to 0.01% weight of platinum and
- from 0.01 to 0.2% weight of at least one crosslinking inhibitor E.

The composition can be a one-part composition comprising components A to E in a single part or, alternatively, a multi-part composition comprising these components in two or more parts, provided components B, and Cat are not present in the same part. For example, a multi-part composition can comprise a first part containing a portion of component A and all of component Cat, and a second part containing the remaining portion of component A and all of component B. In certain embodiments, component A is in a first part, component B is in a second part separate from the first part, and component Cat is in the first part, in the second part, and/or in a third part separate from the first and second parts. Components D, and E may be present in a respective part (or parts) along with at least one of components B, or Cat, and/or can be in a separate part (or parts).

The one-part composition is typically prepared by combining the principal components and any optional ingredients in the stated proportions at ambient temperature. Although the order of addition of the various components is not critical if the composition is to be used immediately, the hydrosilylation catalyst is typically added last at a temperature below about 30° C. to prevent premature curing of the composition.

Also, the multi-part composition can be prepared by combining the components in each part. Combining can be accomplished by any of the techniques understood in the art such as, blending or stirring, either in a batch or continuous process in a particular device. The particular device is determined by the viscosity of the components and the viscosity of the final composition.

In certain embodiments, when the silicone compositions are multipart silicone compositions, the separate parts of the multi-part silicone composition may be mixed in a dispense printing nozzle, e.g. a dual dispense printing nozzle, prior to and/or during printing. Alternatively, the separate parts may be combined immediately prior to printing.

In another embodiment, the crosslinkable silicone composition X is a silicone composition crosslinkable through polycondensation reaction which are well known by the skilled person. In this embodiment, the composition X comprises:
- at least one organopolysiloxane G comprising at least two groups chosen in the group consisting of OH groups and hydrolysable groups,
- a polycondensation catalyst,
- optionally at least one crosslinking agent H and
- optionally a filler D as disclosed before.

Preferably, the organopolysiloxane G comprises at least two groups chosen in the group consisting of: hydroxy, alcoxy, alcoxy-alkylene-oxy, amino, amido, acylamino, aminoxy, iminoxy, cetiminoxy, acyloxy and enoxy groups.

Advantageously, polyorganosiloxane G comprises:
(i) at least two siloxyl units of formula (V):

$$R^1_g Y_h SiO_{\frac{4-(g+h)}{2}} \quad (V)$$

in which
- $R^1$, identical or different, represent monovalents hydrocarbon radicals comprising from 1 to 30 carbon atoms;
- Y, identical or different, represent each an hydrolysable and condensable group or a hydroxy group, and are preferably chosen in the group consisting of hydroxy, alkoxy, alcoxy-alkylene-oxy, amino, amido, acylamino, aminoxy, iminoxy, cetiminoxy, acyloxy, iminoxy, cetiminoxy and enoxy group,
- g is 0, 1 or 2, h is 1, 2 or 3, the sum g+h is 1, 2 or 3, and
(ii) optionally one or more siloxyl unit(s) of formula (VI):

$$R^2_i SiO_{\frac{4-i}{2}} \quad (VI)$$

in which
- $R^2$, identical or different, represent monovalents hydrocarbon radicals comprising from 1 to 30 carbon atoms optionally substituted by one or more halogen atoms or by amino, ether, ester, epoxy, mercapto or cyano groups, and
- i is 0, 1, 2 or 3.

As example of hydrolysable and condensable group Y of alkoxy type it is possible to cite groups having from 1 to 8 carbon atoms such as methoxy, ethoxy, n-propoxy, iso-propoxy, n-butoxy, iso-butoxy, sec-butoxy, tert-butoxy, 2-methoxyethoxy, hexyloxy or octyloxy.

As example of hydrolysable and condensable group Y of alcoxy-alkylene-oxy type, it is possible to cite methoxy-ethylene-oxy.

As example of hydrolysable and condensable group Y of amino type, it is possible to cite methylamino, dimethylamino, ethylamino, diethylamino, n-butylamino, sec-butylamino or cyclohexylamino.

As example of hydrolysable and condensable group Y of amido type, it is possible to cite N-methyl-acetamido.

As example of hydrolysable and condensable group Y of acylamino type, it is possible to cite benzoyl-amino.

As example of hydrolysable and condensable group Y of aminoxy type, it is possible to cite dimethylaminoxy, diethylaminoxy, dioctylaminoxy ou diphenylaminoxy.

As example of hydrolysable and condensable group Y of iminoxy and in particulier cetiminoxy type, it is possible to cite groups derived from the following oximes: acetophenone-oxime, acetone-oxime, benzophenone-oxime, methylethyl-cetoxime, di-isopropylcetoxime ou methylisobutyl-cetoxime.

As example of hydrolysable and condensable group Y of acyloxy type, it is possible to cite acetoxy.

As example of hydrolysable and condensable group Y of enoxy type, it is possible to cite 2-propenoxy.

The viscosity of the organopolysiloxane G is generally comprised between 50 mPa·s and 1000000 mPa·s at 25° C.

Preferably, organopolysiloxane G is of formula (VII):

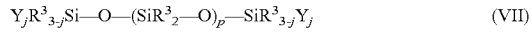  (VII)

In which:
- Y, identical or different, represent each an hydrolysable and condensable group or a hydroxy group, and preferably are chosen in the group consisting of hydroxy, alkoxy, alkoxy-alkylene-oxy, amino, amido, acylamino, aminoxy, iminoxy, cetiminoxy, acyloxy and enoxy,
- $R^3$, identical or different, represent monovalent hydrocarbon radical comprising from 1 to 30 carbon atoms and optionally substituted by one or more halogen atoms or amino, ether, ester, epoxy, mercapto or cyano groups,
- j is 1, 2 or 3, preferably is 2 or 3, and when Y is a hydroxyl group then j=1,
- p is an integer equal or greater than 1, preferably p is an integer comprised between 1 and 2000.

In formula (V), (VI) and (VII), $R^1$, $R^2$ and $R^3$ are preferably:
- alkyl radicals comprising from 1 to 20 carbon atoms, optionally substituted by one or more aryl or cycloalkyl groups, by one or more halogen atoms or by amino, ether, ester, epoxy, mercapto, cyano or (poly)glycol groups. For exemple methyl, ethyl, propyl, isopropyl, butyl, pentyl, hexyl, ethyl-2 hexyle, octyle, decyl, trifluoro-3,3,3 propyl, trifluoro-4,4,4 butyl, pentafluoro-4,4,4,3,3 butyl;
- cycloalkyl and halogenocycloalkyl groups comprising from 5 to 13 carbon atoms such as cyclopentyl, cyclohexyl, methylcyclohexyl, propylcyclohexyl, difluoro-2,3 cyclobutyl, difluoro-3,4 methyl-5 cycloheptyl;
- aryl and halogenoaryl mononuclear comprising from 6 to 13 carbon atoms such as: phenyle, tolyle, xylyle, chlorophenyle, dichlorophenyle, trichlorophenyle; or
- alcenyl radicals comprising from 2 to 8 carbon atoms such as: vinyl, allyl and butene-2 yl.

In the particular embodiment when G is of formula (VII) with Y of hydroxyl type, thus d is preferably 1. In this case, it is preferably to use poly(dimethylsiloxane) having terminal silanols groups (also called «alpha-omega» position).

Organopolysiloxane G can also be chosen in the group consisting of organopolysiloxane resins carrying at least one hydroxy or alkoxy group, groups which are either condensable or hydrolysable, which comprise at least two different siloxyl units chosen among groups of formula M, D, T and Q with

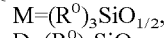
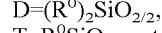
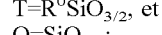
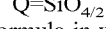

formula in which $R^0$ represents a monovalent hydrocarbon group comprising from 1 to 40 carbon atoms, and preferably from 1 to 20 carbon atoms, or a group —OR''' with R'''=H or an alkyl radical comprising from 1 to 40 carbon atoms, and preferably from 1 to 20 carbon atoms; with the condition that the resins comprise at least one motif T or Q unit.

Said resin has preferably a weight content of hydroxy or alcoxy substituants comprised between 0.1 and 10% by weight with respect to the weight of the resin, and preferably a weight content of hydroxy or alcoxy substituants comprised between 0.2 and 5% by weight with respect to the weight of the resin.

The organopolysiloxane resins have generally about 0.001 to 1.5 OH groups and/or alkoxyl per silicium atom. These organopolysiloxane resins are generally prepared by co-hydrolysis and co-condensation of chlorosilanes such as the ones of formula $(R^{19})_3SiCl$, $(R^{19})_2Si(Cl)_2$, $R^{19}Si(Cl)_3$ or $Si(Cl)_4$, radicals $R^{19}$ are identical or different and are in the group consisting of linear or branched alkyl in $C_1$ to $C_6$, phenyl and trifluoro-3,3,3 propyl. For example $R^{19}$ is methyl, ethyl, isopropyle, tertiobutyl and n-hexyl.

Examples of resins are silicic resins of T(OH), $DT^{(OH)}$ $DQ^{(OH)}$ $DT^{(OH)}$, $MQ^{(OH)}$, $MDT^{(OH)}$ $MDQ^{(OH)}$ type or a mixture.

In this second embodiment, the silicone composition crosslinkable through polycondensation reaction can further comprise such crosslinking agent H. It is preferably an organosilicium compound carrying per molecule more than 2 hydrolysable and condensable groups linked to the silicium atoms. Such agents are well known from the skilled person and are commercially available.

The crosslinking agent H is preferably a silicium compound whose each molecule comprises at least 3 hydrolysable and condensable Y groups, said agent H having formula (VIII):

  (VIII)

In which
- $R^4$ radicals, identical or different, represent monovalent hydrocarbon radicals in $C_1$ to $C_{30}$,
- Y, identical or different, are chosen in the group consisting of alkoxy, alkoxy-alkylene-oxy, amino, amido, acylamino, aminoxy, iminoxy, cetiminoxy, acyloxy or enoxy groups, and preferably Y is an alcoxy, acyloxy, enoxy, cetiminoxy or oxime group,
- k=2, 3 or 4, preferably k=3 or 4.

Examples of Y groups are the same as the ones cited for G above when Y is an hydrolysable and condensable group.

Other examples of crosslinking agent H, are alkoxysilanes and partial hydrolysis products of silane of formula (IX):

  (IX)

$R^6$, identical or different, represent alkyl radical comprising from 1 to 8 carbon atoms such as methyl, ethyl, propyl, butyl, pentyl, ethyl-2 hexyl, octyl and decyl, oxyalkylenes groups in $C_3$-$C_6$, $R^5$, identical or different, represent a saturated or unsaturated, linear or branched aliphatic hydrocarbon group, carbocycle group, saturated or unsaturated and/or aromatic, monocycle or polycycle, and I is 0, 1 or 2.

Among crosslinking agent H, alcoxysilanes, cetiminoxysilanes, alkyl silicates and alkyl polysilicates, in which the organic radicals are alkyl radical shaving from 1 to 4 carbon atoms are prefered.

Preferably, the following crosslinking agent H, are used alone or in mixture:

ethyl polysilicate and n-propyl polysilicate;

alkoxysilanes such as dialkoxysilanes, for example dialkyldialkoxysilanes, trialkoxysilanes, for example alkyltrialkoxysilanes, and tetraalkoxysilanes, preferably propyltrimethoxysilane, methyltrimethoxysilane, methyltriethoxysilane, ethyltrimethoxysilane, ethyltriethoxysilane, isobutyltrimethoxysilane, isobutyltriethoxysilane, propyltriethoxysilane, tetramethoxysilane, tetraethoxysilane, tetrapropoxysilane, tetrabutoxysilane, 1,2-bis(trimethoxysilyl)ethane, 1,2-bis(triethoxysilyl)ethane, tetra-isopropoxysilane, phenyltriethoxysilane, phenyltrimethoxysilane, vinyltriethoxysilane, vinyltrimethoxysilane and those of following formula: $CH_2=CHSi(OCH_2CH_2OCH_3)_3$, $Si(OC_2H_4OCH_3)_4$ and $CH_3Si(OC_2H_4OCH_3)_3$, acyloxysilanes such as the following acetoxysilanes: tetraacetoxysilane, methyl-triacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyldiacetoxysilane and tetraacetoxysilane, silanes comprising alkoxy and acetoxy groups such as: methyl-diacetoxymethoxysilane, methylacetoxydimethoxysilane, vinyldiacetoxy-methoxysilane, vinylacetoxydimethoxysilane, methyldiacetoxyethoxysilane and methylacetoxydiethoxysilane, methyltris(methylethyl-cetoximo)silane, 3-cyanopropyltrimethoxysilane, 3-cyanopropyl-triethoxysilane, 3-(glycidyloxy)propyltriethoxysilane, vinyl-tris(methylethylcetoximo)silane, tetra-kis(methylethylcetoximo)silane.

Generally from 0.1 to 60 parts by weight of crosslinking agent H are used for 100 parts by weight of polyorganosiloxane G. Preferably, 0.5 to 15 parts by weight of crosslinking agent H are used for 100 parts by weight of polyorganosiloxane G.

Crosslinkable silicone composition X (either by polycondensation or polyaddition) can further comprise functional additives usual in silicone composition. The following functional families of additives can be cited:

adhesion promoter;
silicon resins;
thixotropic agents,
color agent and
additives for thermal resistance, oil resistance and fire resistance, for example metallic oxides.

The polycondensation catalyst can be a tin, zinc, iron, zirconium, bismuth or titanium derivative or an organic compounds as amine or guanidines as disclosed for example in EP2268743 and EP2222688. Use may be made, as tin-derived condensation catalyst, of tin monocarboxylates and dicarboxylates, such as tin 2-ethylhexanoate, dibutyltin dilaurate or dibutyltin diacetate (see the work by Noll, "Chemistry and Technology of Silicone", page 337, Academic Press, 1968, 2nd edition, or the patents EP 147 323 or EP 235 049). Other possible metal derivatives include chelates, for example dibutyltin acetoacetonate, sulfonates, alcoholates, etc.

Adhesion promoter are largely used in silicone composition. Advantageously, in the process according to the invention it is possible to use one or adhesion promoter chosen in the group consisting of:

alkoxylated organosilanes comprising, per molecule, at least one $C_2$-$C_6$ alkenyl group, organosilicate compounds comprising at least an epoxy radical chelates of metal M and/or metallic alkoxydes of formula:

$M(OJ)_n$, in which

M is chosen in the group consisting of: Ti, Zr, Ge, Li, Mn, Fe, Al and Mg or their mixtures n=valence of M and J=linear or branched alkyl in $C_1$-$C_8$, Preferably M is chosen in the group consisting of: Ti, Zr, Ge, Li or Mn, and more preferably M is Titane. It is possible to associate for example an alkoxy radical of butoxy type.

Silicon resins are branched organopolysiloxanes well known and commercially available. They present, in their structure, at least two different units chosen among those of formula $R_3SiO_{1/2}$ (M unit), $R_2SiO_{2/2}$ (D unit), $RSiO_{3/2}$ (T unit) and $SiO_{4/2}$ (Q unit), at least one of these units being a T or Q unit.

Radical R are identical or different and chosen in the group consisting in alkyl linear or branched in C1-C6, hydroxyl, phenyl, trifluoro-3,3,3 propyl. Alkyl radicals are for example methyl, ethyl, isopropyl, tertiobutyl and n-hexyl.

As examples of branched oligomers or organopolysiloxanes polymers, there can be cited MQ resins, MDQ resins, TD resins and MDT resins, the hydroxyl functions can be carried by M, D and/or T units. As examples of resins that are particularly well suited, there can be cited hydroxylated MDQ resin having from 0.2 to 10% by weight of hydroxyl group.

In step 3 the crosslinkable silicone composition X is printed at temperature T1 such as defined above. Temperature T1 should be maintained all over the 3D-printing process to keep the constraint environment.

Printing is preferably carried out layer by layer with a 3D-printer. Advantageously the 3D printer is an extrusion 3D printer.

Advantageously, to maintain constant the temperature T1, the container and the 3D-printer are put into a thermoregulated enclosure.

3D printing is generally associated with a host of related technologies used to fabricate physical objects from computer generated, e.g. computer-aided design (CAD), data sources "3D printer" is defined as "a machine used for 3D printing" and "3D printing" is defined as "the fabrication of objects through the deposition of a material using a print head, nozzle, or another printer technology."

"Printing" is defined as depositing of a material, here a crosslinkable silicone composition X, using a print head, nozzle, or another printer technology.

In this disclosure "3D or three dimensional article, object or part" means an article, object or part obtained by additive manufacturing or 3D printing as disclosed above.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed using a computer-aided design software.

The computer generated data source or program is typically converted into a standard tessellation language (STL) file format; however other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

An extrusion 3D printer is a 3D printer where the material is extruded through a nozzle, syringue or orifice during the manufacturing process. Material extrusion generally works by extruding material through a nozzle, syringe or orifice to print one cross-section of an object, which may be repeated for each subsequent layer. The extruded material bonds to the layer below it during cure of the material.

In one preferred embodiment, the method for manufacturing a three-dimensional silicone elastomer article uses an extrusion 3D printer. Crosslinkable silicone compositions X are extruded through a nozzle. The nozzle may be heated to aid in dispensing the addition crosslinking silicone composition.

The silicone composition X to be dispensed through the nozzle may be supplied from a cartridge-like system. The cartridge may include a nozzle or nozzles with an associated fluid reservoir or fluids reservoirs. It is also possible to use a coaxial two cartridges system with a static mixer and only one nozzle. Pressure will be adapted to the fluid to be dispensed, the associated nozzle average diameter and the printing speed.

Because of the high shear rate occurring during the nozzle extrusion, the viscosity of the crosslinking silicone compositions X is greatly lowered and so permits the printing of fine layers.

Cartridge pressure could vary from 1 (atmospheric pressure) to 28 bars, preferably from 1 to 10 bars and more preferably from 2 to 8 bars. An adapted equipment using aluminum cartridges shall be used to resist such a pressure.

The nozzle and/or build platform moves in the X-Y (horizontal plane) to complete the cross section of the object, before moving in the Z axis (vertical) plane once one layer is complete. The nozzle has a high XYZ movement precision around 10 µm. After each layer is printed in the X, Y work plane, the nozzle is displaced in the Z direction only far enough that the next layer can be applied in the X, Y work place. In this way, the object which becomes the 3D article is built one layer at a time from the bottom upwards.

The average diameter of the nozzle is related to the thickness of the layer. In an embodiment, the diameter of the layer is comprised from 50 to 2000 µm, preferably from 100 to 800 µm and most preferably from 100 to 500 µm.

Advantageously, printing speed is comprised between 1 and 50 mm/s, preferably between 5 and 30 mm/s to obtain the best compromise between good accuracy and manufacture speed.

Step 4 of the process of the invention is optional and depends among other things on the crosslinkable silicone composition X, the temperature T1 and the type of object that is printed. As mentioned above, the crosslinkable silicone composition X can be a silicone composition crosslinkable through addition reaction or through polycondensation reaction. The skilled person knows that depending on the crosslinkable silicone composition X, the kinetic of the crosslinking step is variable. As known by the skilled person in the field of 3D-printing, the crosslinking begins as soon as the beginning of the printing step and its kinetic depends on the nature of the composition. The objective is to be able to recover the article formed while keeping its shape without any deformation. Thus, in some cases, at the end of step 3, the article can be strong enough to be recovered and the crosslinking if necessary, can be finished later. When step 4 is carried out, the crosslinking can be partial or total as far as it is possible to recover the article while keeping its shape without any deformation. Preferably, step 4 is non-optional.

The crosslinking step 4 can be made by any methods known by the skilled person in function of the crosslinkable silicone composition X used. Thus, the crosslinking step can be done by waiting few minutes or few hours at T1 until crosslinking of the silicone composition X, or by heating at a temperature T2. Temperature T2 depends on the crosslinkable silicone composition X used. This temperature can be determined by the skilled person based on its general knowledge and the information, especially given in the data sheet, regarding the crosslinkable silicone composition X used. Preferably, T2 is comprised between 30 and 90° C., preferably between 40 and 70° C.

Step 5 of the process according to the invention enables to liquefy the gel formed from composition C and thus to recover the silicone elastomer article in step 6 with few amount of gel. This step advantageously enables to recover a great part of composition C which can then be recycled. Temperature T3 can thus be determined by the skilled person based on composition C. Preferably, T3 is lower than 15° C., preferably comprised between 0 and 15° C., preferably between 0 and 10° C.

Preferably, in the process according to the invention:
T1 is comprised between 25 and 50° C., preferably between 25 and 40° C., for example between 25 and 35° C., more preferably between 28 and 32° C., and/or
T3 is lower than 15° C., preferably comprised between 0 and 15° C., preferably between 0 and 10° C.

In a particular embodiment step 5 is absent.

Preferably, when step 5 is absent then step 7 is carried out to eliminate all the gel around the silicone elastomer article recovered at step 6.

Step 5 and 6 can be reversed. Indeed, the silicone elastomer article can be removed and then placed at temperature T3 lower than the sol-gel transition temperature of composition C in order to liquefy the residual gel onto the article.

Advantageously, after steps 5 and 7 composition C is recovered and is recycled in step 1. Composition C can thus be reused at least 30 times.

Advantageously, the use of a poloxamer according to the invention enables to avoid the use of any solvent other than water in the process of the invention. Accordingly, the process of the invention is also preferably characterized in that it does not used solvent other than water. This is of great interest especially for biological and medical uses of the articles obtained.

As mentioned above, the crosslinkable silicone composition X obtained after step 4 can be partially crosslinked. In those cases, a further step of crosslinking is carried out at the end of the process, after step 6 or 7. This further crosslinking step can be carried out by any means known by the skilled person in function of the crosslinkable silicone composition X used. It can for example carried out by heating, for example between 100 and 250° C., or under UV irradiation between 50 and 240 W/cm for Mercury arc lamps or with LED having irradiance higher than 15 mW/cm².

Optionally, the resulting articles may be subjected to different post-processing regimes. In an embodiment, the method further comprises the step of heating the three-dimensional silicone article. Heating can be used to expedite cure. In another embodiment, the method further comprises the step of further irradiating the three-dimensional silicone article. Further irradiation can be used to expedite cure. In another embodiment, the method further comprises both steps of heating and irradiating the three-dimensional silicone article. Optionally, post-processing steps can greatly improve the surface quality of the printed articles. Sanding is a common way to reduce or remove the visibly distinct layers of the model. Spraying or coating the surface of the elastomer article with a heat or UV curable RTV or LSR silicone composition can be used to get the right smooth surface aspect. A surfacing treatment with a laser can also be done.

For medical applications, a sterilization of the final elastomer article can be obtained for example: by heating either in a dry atmosphere or in an autoclave with vapor, for example by heating the object at a temperature greater than 100° C., under gamma ray, sterilization with ethylene oxide, sterilization with an electron beam.

The present invention also related to the silicone elastomer article obtained or susceptible to be obtained by the process according to the invention. The article can be any article with simple or complex geometry. It can be for example anatomic models (functional or non functional) such as heart, lumb, kidney, prostate ... models for surgeons and educative world or orthotics or prostheses or even implants of different classes such as long term implants: hearing aids, stents, larynx implants, etc.

The present invention also relates to the use of a composition C according to the invention as a constrained environment for manufacturing a silicone elastomer article with a 3D printer.

The present invention also relates to the use of poly(oxyalkylene glycol), especially the preferred poly(oxyalkylene glycol) especially poly(oxyethylene glycol) (or polyethylene oxide, PEG), in a gel of poloxamer to improve self-healing while keeping and improving the properties of the gel for FRESH 3D printing.

The present invention also relates to a composition C comprising water, at least one poloxamer and a poly(oxyalkylene glycol). The nature and amount of poloxamer and poly(oxyalkylene glycol) are preferably as described above.

FIG. 1 represents the physiological shape composed of a mitral valve, eight chordae tendineae and two medial papillary muscles.

The present invention will now be disclosed by means of the following non-limiting examples.

Example 1: General Procedure for the Preparation of Composition C

Poloxamer 407 (P407), (Sigma-Aldrich, USA) was solubilized using the "cold method" described by Schmolka (Schmolka Irving R., Artificial skin I. Preparation and properties of pluronic F-127 gels for treatment of burns. J. Biomed. Mater. Res. 6, 571-582 (2004)) into ice cold deionized water. The solution was stored overnight at 4° C. to complete the solubilisation and degassed.

Poly(oxyethylene glycol) 400 (PEG400) ($M_w$=400 g·mol$^{-1}$) (Sigma-Aldrich, USA) was diluted into ice cold ultra-pure water before the addition of P407.

Before printing in support medium, the solutions were poured into a crystallizer and warmed up to ambient temperature until gelation.

Example 2: Preparation of Different Compositions C

Following the general procedure described in example 1, the following composition have been prepared:

TABLE 1

| Composition | Weight ratio PEG400/P407 | Ultrapure water weight (g) | P407 weight (g) | PEG400 weight (g) |
|---|---|---|---|---|
| CC1 | — | 100 | 15.0 | 0 |
| CC2 | — | 100 | 20.0 | 0 |
| CC3 | — | 100 | 22.5 | 0 |
| CC4 | — | 100 | 25.0 | 0 |
| CC5 | — | 100 | 30.0 | 0 |
| C1 | 1/3 | 100 | 30.0 | 10.0 |
| C2 | 1/2 | 100 | 30.0 | 15.0 |
| C3 | 2/3 | 100 | 30.0 | 20.0 |
| C4 | 1/1 | 100 | 30.0 | 30.0 |
| C5 | 4/3 | 100 | 30.0 | 40.0 |

Example 3: Rheological Characterization of Compositions C

Rheology measurements were conducted using a controlled-stress rheometer (DHR-2 rheometer, TA Instruments, USA) with concentric cylinders geometry of 14 mm radius and 42 mm height. 15 mL of composition C were introduced with a gap fixed at 3580 μm. First, gelation temperatures ($T_{gel}$) were obtained from a frequency sweep procedure (from 0.1 to 100 rad/s) after linear field checking. The gelation temperature was defined when tan δ=G"/G'=1. Then, the static yield stress values were measured by applying a shear rate sweep from 10 to $10^{-5}$ s$^{-1}$ and measuring the stress at various temperatures: 10 to 40° C. with a step of 5° C. (Table 2). The viscosity of the silicone material was measured with a cone plate geometry of 40 mm radius and angle of 2° with a 50-μm gap.

TABLE 2

| Compositions C | Static yield stress (Pa) at | | | | |
|---|---|---|---|---|---|
| | 10° C. | 20° C. | 25° C. | 30° C. | 40° C. |
| CC1 | $1.00 \times 10^{-4}$ | $1.00 \times 10^{-4}$ | $5.00 \times 10^{-4}$ | $1.00 \times 10^{-4}$ | $1.00 \times 10^{-4}$ |
| CC2 | $1.00 \times 10^{-4}$ | $1.00 \times 10^{-4}$ | $1.00 \times 10^{-3}$ | $3.30 \times 10^{1}$ | $8.00 \times 10^{1}$ |
| CC3 | $1.00 \times 10^{-4}$ | $1.60 \times 10^{-4}$ | $6.40 \times 10^{1}$ | $11.7 \times 10^{1}$ | $11.7 \times 10^{1}$ |
| CC4 | $1.60 \times 10^{-3}$ | $1.00 \times 10^{-3}$ | $7.50 \times 10^{1}$ | $13.2 \times 10^{1}$ | $19.2 \times 10^{1}$ |
| CC5 | $1.00 \times 10^{-4}$ | $7.50 \times 10^{1}$ | $16.7 \times 10^{1}$ | $19.4 \times 10^{1}$ | $19.6 \times 10^{1}$ |
| C1 | $3.00 \times 10^{-3}$ | $8.50 \times 10^{1}$ | $14.2 \times 10^{1}$ | $16.0 \times 10^{1}$ | $17.0 \times 10^{1}$ |
| C2 | $1.00 \times 10^{-4}$ | $8.40 \times 10^{1}$ | $13.1 \times 10^{1}$ | $14.5 \times 10^{1}$ | $15.9 \times 10^{1}$ |
| C3 | $1.00 \times 10^{-4}$ | $8.20 \times 10^{1}$ | $11.7 \times 10^{1}$ | $12.7 \times 10^{1}$ | $13.5 \times 10^{1}$ |
| C4 | $2.00 \times 10^{-3}$ | $12.7 \times 10^{1}$ | $13.9 \times 10^{1}$ | $14.2 \times 10^{1}$ | $14.3 \times 10^{1}$ |
| C5 | $2.30 \times 10^{1}$ | $3.60 \times 10^{1}$ | $4.50 \times 10^{1}$ | $5.00 \times 10^{1}$ | $5.40 \times 10^{1}$ |

These results show that the poly(ethylene glycol) acts as a plasticizer and enable to decrease the static yield stress

TABLE 3

| Compositions C | Viscosity at 25° C. (Pa · s) |
|---|---|
| CC5 | $5.3 \times 10^{5}$ |
| C1 | $3.9 \times 10^{5}$ |
| C2 | $3.9 \times 10^{5}$ |
| C3 | $3.3 \times 10^{5}$ |
| C4 | $5.2 \times 10^{5}$ |
| C5 | $0.7 \times 10^{5}$ |

Example 4: 3D Printing Process

A highly complex 3D object was used as to challenge the FRESH technique: a physiological shape composed of a mitral valve, eight chordae tendineae and two medial papillary muscles (FIG. 1). To enable such a complex 3D printing, a 6-axis robotic arm (the BioassemblyBot® (Advanced Solutions Life Sciences, USA)) was used which enables the printing of the three components (valve, chordae and muscles) with different printing path parameters. Once the printing finished, the object was cured (ambient temperature polycondensation), removed and simply cleaned with cold water.

The printing temperature was fixed at 22±1° C. PDMS (AMSil™ 20101, RTV-1 alcoxy, Elkem Silicones, France) with tack-free time of 10 minutes in 50% relative humidity atmosphere, was used as a printing material loaded into a ink cartridge of 30 cm3 (30 CC (Nordson EFD, USA)). The cartridges were fitted with a 200 µm diameter conical nozzle (Nordson EFD, USA) and extruded under pneumatic pressure (70 PSI). 3D printing was controlled with TSIM software (Advanced Solutions Life Sciences, V1.1.142, USA) at a printing speed of 10 mm/sec for cartesian prints and 1 mm/sec for path-based prints. After deposition, PDMS was cured at 25° C. during 48 h. Prior recovering the printed object, the support bath was placed at 4° C. overnight. The mitral valve was then rinsed with cold water. Once dried, dimensional measurements were performed using a calliper on specific parts of the object.

FRESH 3D printing of the selected complex form of FIG. 1 is not reachable for comparative composition CC1, CC2 and CC5. For compositions CC1 and CC2, the gel form dos not enable to suspend the printing material (the static yields stresses were negligible, composition CC1 did not exhibit gelation temperature and CC2 only generate a gel at temperature higher than 30° C.

For composition CC5, a poor self-healing behaviour was identified with a high static yield stress value (167 Pa at 25° C.). This static yield stress enabled the printing of the complex object but with a poor fidelity, mainly due to the existence of un-healed crevasses leading to the diffusion of the printing material out of its initial deposition path. The overall print fidelity was 56.0±0.76% (see table 4 below), with its low resolution mitral valve surface, its non-connected chordae tendineae and some missing parts of the medial papillary muscles.

TABLE 4

| Composition CC5 | Valve | | | Muscles | | | | | | Cordae | |
|---|---|---|---|---|---|---|---|---|---|---|---|
| Part | a | b | c | d | e | f | g | h | i | j | k |
| Mean measured dimensions (mm) | 34.8 ± 0.05 | 27.9 ± 0.03 | 8.72 ± 0.02 | 14.3 ± 0.07 | 4.51 ± 0.01 | 3.75 ± 0.01 | 0.00 ± 0.00 | 10.0 ± 0.08 | 34.3 ± 0.03 | 0.00 ± 0.00 | 0.00 ± 0.00 |
| STL values (mm) | 35.5 | 27.5 | 10.4 | 14.9 | 5.07 | 4.95 | 8.89 | 10.0 | 39.2 | 15.5 | 13.3 |
| Difference (mm) | 0.73 ± 0.05 | 0.043 ± 0.03 | 1.68 ± 0.02 | 0.58 ± 0.07 | 0.56 ± 0.01 | 1.20 ± 0.01 | 8.89 ± 0.00 | 0.03 ± 0.08 | 4.87 ± 0.03 | 15.5 ± 0.00 | 13.3 ± 0.00 |
| Difference (%) | 2.07 ± 0.14 | 1.58 ± 0.11 | 16.2 ± 0.19 | 3.89 ± 0.48 | 11.1 ± 0.23 | 24.3 ± 0.23 | 100 ± 0.00 | 0.33 ± 0.81 | 12.4 ± 0.09 | 100 ± 0.00 | 100 ± 0.00 |
| Mean difference per part (mm) | 0.95 ± 0.10 | | | 2.69 ± 0.21 | | | | | | 14.4 ± 0.00 | |
| Print fidelity per part (%) | 93.4 ± 0.45 | | | 74.7 ± 1.84 | | | | | | 0.00 ± 0.00 | |
| Total mean difference (mm) | 6.02 ± 0.31 | | | | | | | | | | |
| Print fidelity (%) | 56.0 ± 0.76 | | | | | | | | | | |

FRESH 3D printing of the selected complex form of FIG. 1 was also carried out for composition 05. The complete object was suspended within the hydrogel 05 and negligible crevasses were formed at the surface of the gel (even with the 3000 syringe if 23 mm in diameter). Three different sequences for the printing were used, i.e. a cartesian printing of the mitral valve, a multidirectional 6-axes printing of the eight chordae tendineae and a final cartesian printing of the two medial papillary muscles. These three sequences were supposed to bring even more complexity to the printing process since multiple objects shall be connected within the gel with enough cohesion. Here, it is worth to point out that the 8 chordae tendineae were printed as single 400 µm filaments, positioned between the two other sequences but still cohesive with the other objects. This cohesion is also a remarkable feature of the present high resolution printing since this is a recurrent issue when dealing with FRESH 3D printing. All the parts of the product were cohesive with a surface quality and a fidelity toward the initial STL file drastically improved when compared to the product obtained with composition 005. To document this fidelity, dimensional measurements of the printed object were performed and compared to the initial STL (table 5 below).

TABLE 5

| Composition C5 | Valve | | | Muscles | | | | | | Cordae | |
|---|---|---|---|---|---|---|---|---|---|---|---|
| Part | a | b | c | d | e | f | g | h | i | j | k |
| Mean measured dimensions (mm) | 33.31 ± 0.06 | 26.84 ± 0.02 | 8.61 ± 0.11 | 15.09 ± 0.10 | 5.12 ± 0.04 | 5.14 ± 0.12 | 8.71 ± 0.08 | 9.95 ± 0.09 | 38.42 ± 0.19 | 15.57 ± 0.35 | 12.89 ± 0.12 |
| STL values (mm) | 35.5 | 27.5 | 10.4 | 14.9 | 5.07 | 4.95 | 8.89 | 10.0 | 39.2 | 15.5 | 13.3 |
| Difference (mm) | 2.19 ± 0.06 | 0.66 ± 0.02 | 1.79 ± 0.11 | 0.17 ± 0.10 | 0.05 ± 0.04 | 0.19 ± 0.012 | 0.18 ± 0.08 | 0.03 ± 0.09 | 0.73 ± 0.19 | 0.05 ± 0.35 | 0.44 ± 0.12 |
| Difference (%) | 6.18 ± 0.16 | 2.40 ± 0.07 | 17.2 ± 1.06 | 1.16 ± 0.67 | 1.0 ± 0.79 | 3.8 ± 2.46 | 2 ± 0.91 | 0.27 ± 0.95 | 1.9 ± 0.49 | 0 ± 2.27 | 3 ± 0.92 |
| Mean difference per part (mm) | 1.55 ± 0.19 | | | 0.23 ± 0.63 | | | | | | 0.25 ± 0.47 | |
| Print fidelity per part (%) | 91.4 ± 1.29 | | | 74.7 ± 1.84 | | | | | | 0.00 ± 0.00 | |
| Total mean difference (mm) | 0.67 ± 1.29 | | | | | | | | | | |
| Print fidelity (%) | 96.0 ± 3.58 | | | | | | | | | | |

These elements show that the addition of PEG to the poloxamer solution enables to increase self-healing and print fidelity.

The invention claimed is:

1. A process for manufacturing a silicone elastomer article comprising:
   1) Providing a composition C, comprising water, at least one poloxamer and a poly(oxyalkylene glycol), into a container;
   2) Placing the container comprising the composition C at the required temperature T1 to form a gel;
   3) Printing a crosslinkable silicone composition X into the gel obtained in 2) with a 3D printer at the required temperature T1;
   4) Optionally allowing the printed composition X to partially or totally crosslink, optionally by heating, to obtain a silicone elastomer article, in the container;
   5) Optionally placing the container obtained in 4) at a temperature T3 lower than the sol-gel transition temperature of composition C;
   6) Recovering the silicone elastomer article; and
   7) Optionally washing the obtained silicone elastomer article for example with water at a temperature T3 lower than the sol-gel transition temperature of composition C.

2. The process according to claim 1 comprising:
   1) Providing a composition C, comprising water and at least one poloxamer and a poly(oxyalkylene glycol), into a container;
   2) Placing the container comprising the composition C at the required temperature T1 to form a gel;
   3) Printing a crosslinkable silicone composition X into the gel obtained in 2) with a 3D printer at the required temperature T1;
   4) Allowing the printed composition X to partially or totally crosslink, optionally by heating, to obtain a silicone elastomer article, in the container;
   5) Optionally placing the container obtained in 4) at a temperature T3 lower than the sol-gel transition temperature of composition C;
   6) Recovering the silicone elastomer article; and
   7) Optionally washing the obtained silicone elastomer article for example with water at a temperature T3 lower than the sol-gel transition temperature of composition C.

3. The process according to claim 1 wherein the poly(oxyalkylene glycol) has a Mw comprising between –100 and 6000 g/mol.

4. The process according to claim 1, wherein the poly(oxyalkylene glycol) is poly(oxyethylene glycol).

5. The process according to claim 1 wherein the poloxamer is a copolymer composed of poly(propylene oxide) and poly(ethylene oxide) blocks.

6. The process according to claim 1 wherein the poloxamer is a triblock copolymer composed of a central poly(propylene oxide) block and two terminal poly(ethylene oxide) blocks.

7. The process according to claim 1, wherein the poloxamer comprises from 25 to 90% by weight of poly(ethylene oxide) units based on the total weight of the poloxamer.

8. The process according to claim 1, wherein the poloxamer is a triblock copolymer composed of a central poly(propylene oxide) block and two terminal poly(ethylene oxide) block for which the two poly(ethylene oxide) block comprise each 100+/–10 repeat units and the poly(propylene oxide) block comprises 55+/–10 repeat units.

9. The process according to claim 1 wherein in composition C the weight ratio poly(oxyalkylene glycol)/poloxamer is such that the static yield stress of gel C, at a temperature comprised between 20° C. and 50° C., is comprised between 0.5 and 200 Pa.

10. The process according to claim 1 wherein in composition C the weight ratio poly(oxyalkylene glycol)/poloxamer is greater than 0.5.

11. The process according to anyone claim 1, wherein in composition C the amount of poloxamer is comprised between 10 to 40%, by weight based on the total weight of composition C.

12. The process according to claim 1, wherein the composition C further comprises one or more compounds selected from the group consisting of:
a base;
an acid; and
a functionalized silane.

13. The process according to claim 1 wherein:
T1 is comprised between 25 and 50° C., and/or
T3 is lower than 15° C.

14. A composition C comprising water, at least one poloxamer and a poly(oxyalkylene glycol) wherein the weight ratio poly(oxyalkylene glycol)/poloxamer is such that the static yield stress of gel C, at a temperature comprised between 20° C. and 50° C., is comprised between 1 and 200 Pa.

15. A method for manufacturing a silicone elastomer article with a 3D printer, said method comprising using composition C according to claim 1 as a constrained environment.

16. A method for improving self-healing while keeping and improving the properties of a gel for FRESH 3D printing, said method comprising adding a poly(oxyalkylene glycol) in a composition comprising water and a poloxamer and forming the gel.

17. The process according to claim 1, wherein the poly(oxyalkylene glycol) has a Mw comprising between 200 and 1000 g/mol.

* * * * *